United States Patent [19]
Sugimoto

[11] 3,733,971
[45] May 22, 1973

[54] FLUID CYLINDER
[75] Inventor: Masashi Sugimoto, Nagoya, Japan
[73] Assignee: Toyooki Kogyo Kabushiki Kaisha, Okazaki-shi, Aichi-ken, Japan
[22] Filed: Dec. 22, 1971
[21] Appl. No.: 210,708

[30] Foreign Application Priority Data
Dec. 28, 1970 Japan..............................45/127991
Jan. 30, 1971 Japan.................................46/3442

[52] U.S. Cl............................................92/26, 92/30
[51] Int. Cl.................................................F15b 15/26
[58] Field of Search......................92/15, 23, 24, 26, 92/27, 28, 30; 91/41

[56] References Cited
UNITED STATES PATENTS
2,259,815   10/1941   Greve...................................92/28 X
3,665,812   5/1972   Hashimoto et al....................92/27 X

*Primary Examiner*—Martin P. Schwadron
*Assistant Examiner*—Abe Hershkovitz
*Attorney*—Hyman Berman et al.

[57] ABSTRACT

A pressure fluid cylinder having a tubular casing, a piston engaged reciprocably within the casing, two pressure chambers within the casing one on each side of the piston, a piston rod connected to the piston, an annular brake band with radial self-returning force interposed between the outer wall of the piston and the inner wall of the casing, means operative only when in its neutral position to outwardly expand the brake band to frictionally engage the inner wall of the casing and to release the brake band when out of its neutral position, resilient means for normally conditioning the operating means to its neutral position, and pressure receiving means for moving the operating means out of its neutral position upon supply of fluid pressure into either of the two pressure chambers.

12 Claims, 6 Drawing Figures

INVENTOR
MASASHI SUGIMOTO,

BY Berman, Davidson & Berman,
ATTORNEYS

FLUID CYLINDER

BACKGROUND OF THE INVENTION

This invention relates to a pressure fluid cylinder, and more particularly to an apparatus for locking the piston and piston rod of the cylinder at a desired position.

In the prior art, pressure fluid cylinders have generally been used in conjunction with selector valve means to regulate their operation. Such selector valve means usually control the supply and discharge of operation fluid for the cylinder, thus regulating the positioning of the piston within the cylinder. Therefore, it has often occurred that the position of the piston is changed due to leakage of the fluid from the selector valve means and/or in accordance with the variation of the load applied to the piston rod. This is especially true with pneumatically operated fluid cylinders. Thus, conventional cylinders are unable to operate with controlled accurate positioning of their pistons and particularly, where multiple positioning is involved, the problem is intensified. Furthermore, in the event that an external load is applied to the piston rod, no desired positioning of the piston can be secured.

SUMMARY OF THE INVENTION

A prime object of the present invention is, therefore, to provide a pressure fluid cylinder having a piston and a piston rod which can be integrally conditioned by proper selector valve means to a desired position when the same fluid pressure exists in both of the chambers defined in the cylinder casing at the opposite sides of the piston, the piston and the piston rod then being locked firmly at the desired position.

Another object of the present invention is to provide a pressure fluid cylinder, having the above-mentioned characteristics, wherein the locking of the piston can be released smoothly at the start of movement of the piston by the use of proper selector valve means.

It is another object of the invention to provide a pressure fluid cylinder, having the above-mentioned characteristics, wherein the locking of the piston and the piston rod can be maintained for a desired lengthy period of time regardless of any leakage of operation fluid which may occur.

It is still another object of the present invention to provide a pressure fluid cylinder, having the above-mentioned characteristics, wherein the secure locking of the piston and the piston rod can be attained regardless of application of an external force onto the piston rod.

It is a further object of the present invention to provide a pressure fluid cylinder, having the above-mentioned characteristics, wherein brake means is provided for locking of the piston and the piston rod, said brake means being capable off carrying out its frictional engagement and disengagement very smoothly.

A still further object of the present invention is to provide a pressure fluid cylinder, having the above-mentioned characteristics, wherein the structure is very compact, and yet a very effective braking force is obtained.

According to the present invention briefly summarized, there is provided a pressure fluid cylinder of the type having a tubular casing, a piston engaged reciprocably within the casing, two pressure chambers being formed by the piston and the casing at the opposite sides of the piston, respectively, and a piston rod connected to the piston, wherein the improvement comprises a locking device for the piston in the form of annular brake means with radial self-returning force interposed between the outer wall of the piston and the inner wall of the casing, operating means for outwardly expanding the brake means to frictionally engage the inner wall of the casing while said operating means is in its neutral position, and for releasing the brake means while said operating means is out of its neutral position, resilient means for normally conditioning the operating means to its neutral position, and pressure receiving means for moving the operating means out of its neutral position upon supply of fluid pressure into either of the two pressure chambers, the pressure receiving means including an annular pressure receiver axially reciprocable within the piston to form a subpressure chamber and a fluid passageway to connect one of the two pressure chambers with the subpressure chamber.

BRIEF DESCRIPTION OF THE DRAWINGS

The above-mentioned and other objects and features of the present invention will become more apparent from the following description, especially when read in conjunction with the accompanying drawings, in which.

In the drawings like reference numerals designate like, or corresponding parts throughout all the Figures.

DESCRIPTION OF THE PREFERRED EMBODIMENTS

Figure 1:
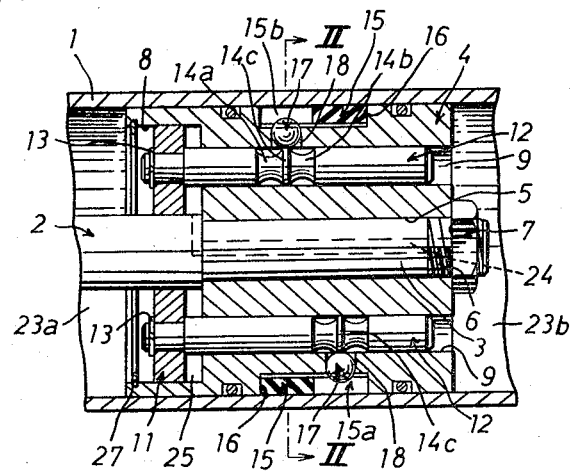
FIG. 1 is an axial cross-sectional view of a pressure fluid cylinder according to the present invention.
Figure 2:
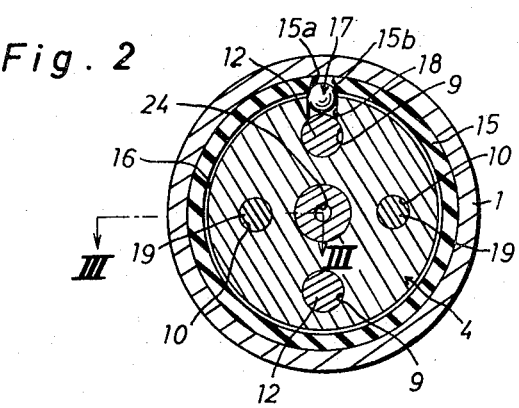
FIG. 2 is a cross-sectional view taken along the line II—II of FIG. 1.
Figure 3:
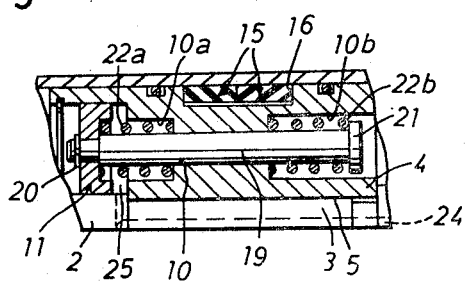
FIG. 3 is a partial cross-sectional view taken along line III—III of FIG. 2.

Referring now to the drawings, particularly to FIGS. 1 to 3, there is illustrated a preferred embodiment of a pressure fluid cylinder constructed in accordance with the present invention, comprising a tubular cylinder casing 1 in which is reciprocably engaged a piston means 4 subdividing the casing 1 into two cylinder chambers 23a and 23b. A central through bore 5 is axially drilled within the piston 4. The piston means 4 further comprises a larger diametered recess 8 bored at the left end portion thereof. Fixedly engaged within the through bore 5 is a smaller diametered right end portion 3 of a piston rod 2. At the right end of the portion 3 of the rod 2 is a threaded portion 6 to which a lock nut 7 is applied to fasten the rod 2 firmly onto the piston 4, the larger diametered portion of rod 2 forming a shoulder held securely against the bottom wall of recess 8.

Within the recess 8 of the piston 4 is provided an annular pressure receiver plate 11 in axially slidable contact with the inner circumferential wall of the recess 8 and with the outer circumferential wall of the piston rod 2. An annular stop member 27 is also fixed within the recess 8 so as to restrict leftward movement of the plate 11.

A pair of plungers 12,12 are reciprocably engaged within a pair of through bores 9,9 provided within the piston 4 parallel to the bore 5. The left end of each of the plungers 12,12 is firmly fixed to the pressure receiver plate 11 by a stop ring 13. Each of the plungers 12,12 has a pair of arcuately cross-sectional grooves 14a and 14b annularly formed about the outer circumferential wall thereof. The two grooves 14a and 14b are separated by a land 14c.

Referring to FIGS. 2 and 3, a second pair of plungers 19,19 are reciprocably engaged within a pair of through bores 10,10 drilled within the piston parallel to the bore 5. The left end of each of the plungers 19,19 is firmly fixed to the pressure receiver plate 11 by a stop ring 20, while the right end of each plunger has a flange 21. A coiled spring 22a is disposed between the pressure receiver plate 11 and the base of a counterbore 10a provided at the left end of each of the bores 10,10. Another coiled spring 22b is interposed between the flange 21 of each of the plungers 19,19 and the base of a counterbore 10b drilled at the right end of each of the bores 10,10. Thus, the plungers 19,19 are normally conditioned to the neutral position thereof by outwardly biasing force of the coiled springs 22a and 22b. The movement of the plungers 12,12 corresponds with that of the associated plungers 19,19, all four plungers being fixed to plate 11.

An annular groove 16 is formed about the outer circumference of the piston 4. Within the groove 16 are received a pair of annular brake bands 15,15 made of a resilient material such as synthetic resin, or the like. A part of each of the brake bands 15,15 is cut off and removed to leave, at positions diametrically opposite each other, the radial cut-off faces 15a,15a and 15b,15b tapered outwardly toward each other, as shown in FIG. 2.

A pair of balls 17,17, each ball cooperating with one of the plungers 12,12, are placed within radial bores 18 in the piston 4 so as to position a portion of each ball between the cut-off faces 15a and 15b of one brake band. When the plunger 12 is in its neutral position, the associated ball 17 is thrust outwardly between the cut-off faces 15a and 15b by the land 14c of the plunger 12 so that the brake band 15 is expanded to frictionally engage the inner circumferential wall of the casing 1. When the plunger 12 is displaced, the ball 17 is retracted into one of the annular grooves 14a or 14b by return resilient force of the brake band 15.

A chamber 25 formed between the pressure receiver plate 11 and the right end face of the recess 8 is connected with the cylinder chamber 23b through a passageway 24 axially disposed in the piston rod 2.

The novel operation of the fluid cylinder, according to this embodiment, is described in detail hereinafter. For the sake of convenience, the functional operation is explained using pneumatic fluid as the pressure medium.

FIGS. 1 to 3 show the state of the device wherein the pressure in both of the cylinder chambers 23a and 23b is equal to atmospheric pressure. Under this condition, the plungers 12,12 are at their neutral positions, as clearly shown in FIG. 1, because of the biasing force of the coiled springs 22a,22a and 22b,22b exerted on the plungers 19,19 and the pressure receiver plate 11.

The balls 17,17 are outwardly urged in radial bores 18,18 by the lands 14c,14c of the plungers 12,12 to consequently enter into the spaces formed between the tapered cut-off faces 15a,15a and 15b,15b of the brake bands 15,15. Thus, the bands 15,15 are strongly expanded into frictional engagement with the inner wall of the casing 1, and the piston means 4 is thus firmly locked against the casing 1. Under this state, even if a load is given, added or removed to, or from the piston rod 2, the piston means 4 is kept firmly in its locked position within the tubular cylinder casing 1. In this manner, the piston rod 2 together with the piston means 4 can be stably held at the predetermined, locked position without moving for a desired period of time.

When pneumatic pressure is supplied into the cylinder chamber 23a to act on the pressure receiver plate 11, while the pressure in the chamber 23b remains equal to atmospheric pressure, the plate 11, plungers 12,12 and the assistant plungers 19,19 will be pushed to the right against the biasing force of the spring means 22a,22a. At this moment, the fluid in the chamber 25 is exhausted into the chamber 23b through the passageway 24. The resilient forces of the brake bands 15,15 thrust the balls 17,17 inwardly into the arc grooves 14a,14a when the plungers 12,12 move to the right. Thus, because of the resilient forces of the brake bands 1 15,15 their cut-off faces 15a,15a and 15b,15b return to their closed, or non-braking positions, frictionally disengaging the brake bands 15,15 from the inner circumferential wall of the cylinder casing 1, and allowing the piston 4 and the piston rod 2 to move smoothly to the right.

When atmospheric pressure is applied to both chambers 23a and 23b the rightward movement of the piston rod 2 and the piston 4 will stop, and the pressure receiver plate 11 and the plungers 12,12 and 19,19 together are instantaneously returned to their original neutral positions, as shown in FIG. 1, by the biasing force of the spring means 22a,22a. This, again, causes balls 17,17 to be positioned on the lands 14c,14c of the plungers 12,12 and to expand the brake bands 15,15 which again engage frictionally with the inner circumferential wall of the cylinder casing 1. Thus, the piston rod 2 as well as the piston means 4 can be stably held at desired positions without moving for any desired period of time.

When pneumatic pressure is delivered into the cylinder chamber 23b while the pressure in the chamber 23a is equal to atmospheric pressure, the higher pneumatic pressure is lead into the chamber 25 through the passageway 24 and pushes the pressure receiver plate 11 leftward against the biasing force of the springs 22b,22b. Thus, the plungers 12,12 and 19,19 are urged leftward along with the plate 11. The balls 17,17 are thrust into the grooves 14b,14b by the return force of the brake bands 15,15, frictionally disengaging the brake bands from the inner circumferential wall of the casing 1. When both chambers 23a and 23b are connected to atmospheric pressure, the biasing force of the springs 22b,22b returns the plate 11 together with the plungers 12,12 and 19,19 to their original positions. The balls 17,17 are thrust into the spaces between the band cut-off faces 15a,15b to expand the bands and complete frictional engagement between the brake bands 15,15 and the inner wall of the casing 1.

As has been described in detail, so long as a source of pneumatic pressure is not connected to either one of the cylinder chambers 23a and 23b, the balls 17,17 stay on the lands 14c,14c of the plungers 12,12, expanding the brake bands 15,15 to engage frictionally with the inner circumferential wall of the tubular cylinder casing 1. Thus, due to the locking effect of the brake bands 15,15 against the casing 1, the piston rod 2 as well as the piston 4 can be stably held at the predetermined position without moving for a desired period of time, regardless of any variation of the load against the rod 2 and/or leakage of operation fluid.

Upon delivery of pneumatic pressure to either one of the cylinder chambers 23a and 23b, the locking of the brake bands 15,15 against the casing 1 is instantaneously released so as to enable the piston rod 2 and the piston 4 to move smoothly, respectively, to the right, or to the left.

From the above it should be clear that exactly the same function and operation of the fluid cylinder described can be obtained when hydraulic fluid is substituted for pneumatic fluid as the source of pressure.

Figure 4:
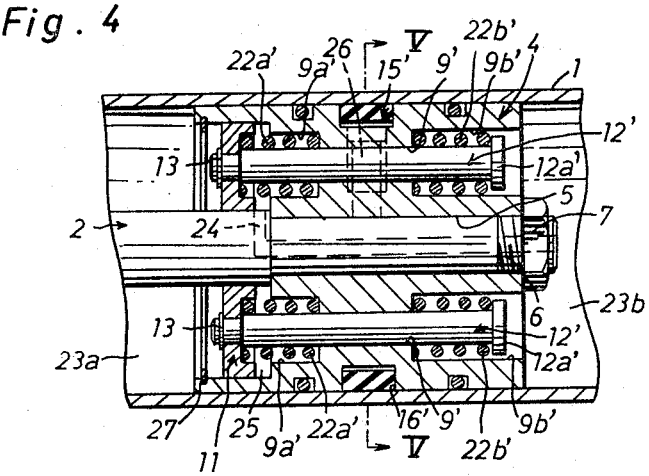
FIG. 4 is an axial cross-sectional view, similar to FIG. 1, illustrating a pressure fluid cylinder according to another embodiment of the present invention.
Figure 5:
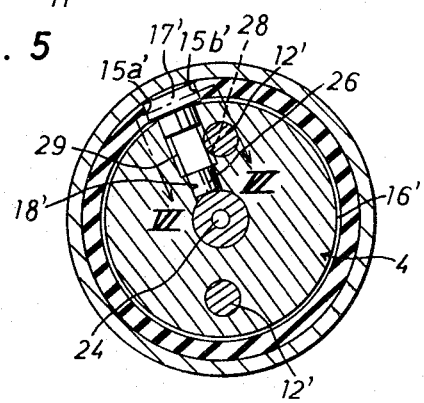
FIG. 5 is a view of elevational cross-section taken along line V—V of FIG. 4.
Figure 6:
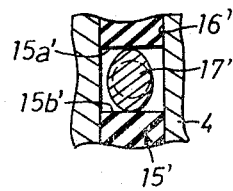
FIG. 6 is a fragmentary cross-sectional view taken along line VI—VI of FIG. 5.

A second embodiment of the present invention is disclosed in FIGS. 4 to 6, wherein similar parts to those of the first embodiment are indicated with similar reference numerals. The general construction of this second embodiment is the same as that of the first embodiment with the following differences.

A pair of plungers 12',12' are reciprocably engaged respectively within a pair of bores 9',9' drilled through the piston 4 parallel to the central through bore 5. The left end of each of the plungers 12',12' is firmly fixed to the pressure receiver plate 11 by means of the stop ring 13, while the right end thereof has a flange 12a'. The through bores 9',9' comprise counterbores 9a' and 9b', respectively, at the left and right ends thereof.

First springs 22a',22a' are disposed between the pressure receiver plate 11 and the right end bases of the bores 9a',9a', and second springs 22b',22b' are interposed between the flanges 12a',12a' and the left end bases of the bores 9b',9b'. The springs 22a',22a' and 22b',22b' bias the plungers 12',12', respectively, leftward and rightward to hold the plungers 12',12' in their neutral positions. A rotor 26 is rotatably disposed in a radial bore 18' provided adjacent one of the plungers 12',12' within the piston 4. An elliptic cam 17' is firmly mounted at the outer end of the rotor 26 and a pinion gear 29 is in mesh with a rack 28 formed along, or affixed to the plunger 12' adjacent the radial bore 18' as is best shown in FIG. 5.

Within the annular groove 16' on the outer circumferential wall of the piston 4, is placed an annular brake band 15' made of resilient material such as synthetic resin, or the like. A part of the brake band 15' is cut off so as to have radial cut-off faces 15a', 15b' as shown in FIG. 6.

The second embodiment operates in the manner described below in detail. For the sake of convenience, pneumatic fluid is again used as the pressure source. In the drawings, FIGS. 4 to 6 show a state wherein pressure in both of the cylinder chambers 23a and 23b is equal to atmospheric pressure. Under this condition, the pressure receiver plate 11 and the plungers 12', 12' are in their neutral positions, as shown in FIG. 4, due to the biasing force of the springs 22a',22a' and 22b',22b'. The elliptic cam 17' of the rotor 26 is held at the position, shown in FIG. 6, in which the circumferential portions adjacent the longer diameter of the cam contact the cut-off faces 15a' and 15b' of the brake band 15. This expands the brake bands 15' so as to engage frictionally with the inner circumferential wall of the casing 1, and the piston means 4 is firmly locked against the cylinder casing 1. In this condition, even if a load is given, added, or removed, to or from the piston rod 2, the piston 4 is firmly kept in its locked position within the cylinder casing 1 by the locking effect of the brake band 15'. Therefore, the piston rod 2, as well as the piston 4, can be held at their predetermined neutral positions without moving for a desired period of time.

When pneumatic pressure is supplied to the cylinder chamber 23a, while pressure in the chamber 23b remains equal to atmospheric pressure, the pneumatic pressure acts on the pressure receiver plate 11. This causes the plate 11 and the plunger 12', 12' to move rightward against the biasing force of the springs 22a',22a'. The rightward movement of the plungers 12',12' in turn, produces rotation of the rotor 26. In accordance with the rotation of the rotor 26, the elliptic cam 17' is rotated through movements of the rack portion 28 of the plunger 12' and the pinion gear 29. Thus, the circumferential portions of the cam adjacent its longer diameter move away from the cut-off faces 15a' and 15b' of the brake band 15', and the circumferential portions of the cam adjacent its shorter diameter contact the cut-off faces 15a' and 15b', releasing the locking condition of the brake band 15' against the inner circumferential wall of the casing 1. This permits the piston rod 2 as well as the piston means 4 to move smoothly to the right.

When the pressure in both of the chambers 23a and 23b is equalized to atmospheric pressure the rightward movement of the piston 4 together with its rod 2 is instantaneously stopped and the pressure receiver plate 11 as well as the plungers 12', 12' are returned to their neutral positions, as shown in FIG. 4, by the biasing force of the spring 22a',22a'. This causes the elliptic cam 17' to rotate so as to again contact its circumferential portions adjacent the longer diameter firmly against the cut-off faces 15a' and 15b' of the brake band 15' so as to expand and lock the brake band 15' strongly to the tubular cylinder casing 1. Thus, the piston rod 2, as well as the piston 4, is again stably held at the desired position to the right without moving for any desired period of time.

When pneumatic pressure from a source is directed into the chamber 23b while the pressure in the chamber 23a is equal to atmospheric pressure, the pneumatic pressure is lead into the chamber 25 through the passageway 24, and pushes the pressure receiver plate 11 leftward against the biasing force of the springs 22b',22b'. The leftward movement of the pressure receiver plate 11 simultaneously causes leftward movement of the plungers 12', 12', the elliptic cam 17' being rotated through the pinion gear 29 meshed with the rack portion 28 of the plunger 12'. The rotation of the elliptic cam 17' releases the locking of the brake band 15' against the inner circumferential wall of the casing 1 in the same manner as discussed hereinabove. Thus, the piston means 4 and the piston rod 2 can, again, move smoothly without interference from the brake band.

When the pressure in the chamber 23b is decreased to atmospheric pressure, the springs 22b',22b' return the plungers 12',12' to their neutral positions to lock the brake band 15' against the inner wall of the casing 1. This locks the piston in a desired leftward position as described above, so long as pneumatic pressure is not directed into either one of the cylinder chambers 23a and 23b, the elliptic cam 17' remaining turned so as to expand the brake band 15' into frictional engagement with the inner circumferential wall of the tubular cylinder casing 1. The piston means 4 and the piston rod 2 can, therefore, be stably held at the predetermined leftward position without moving for any desired period of time, regardless of the variations of the load against the piston rod 2 and/or leakage of the operation fluid.

Upon delivery of pneumatic pressure into either one of the cylinder chambers 23a or 23b, the locking of the brake band 15' against the tubular cylinder casing 1 is instantaneously released, and the piston 4 and the piston rod 2 are able to move very smoothly.

Although the use of pneumatic fluid has been adopted throughout this description for the sake of convenience, it should be understood that exactly the same effect, or mode of functioning can be obtained by use of hydraulic fluid instead of pneumatic fluid.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

I claim:

1. A pressure fluid cylinder comprising a tubular casing, a piston with a connected piston rod reciprocable within said casing and defining two pressure chambers one on each side of the piston, brake means interposed between the outer wall of said piston and the inner wall of said casing, and means for operating said brake means mounted on said piston including pressure receiving means operable to engage the brake means against the casing when pressure in both of said pressure chambers is the same and to release the brake means when the pressure in one of said pressure chambers exceeds that in the other, said pressure receiving means including an annular member axially reciprocable within said piston to form a subpressure chamber, said subpressure chamber being connected by a fluid passageway to one of said pressure chambers.

2. A pressure fluid cylinder according to claim 1, wherein said brake means comprises at least one annular brake band disposed within an annular groove formed in the outer wall of said piston.

3. The pressure fluid cylinder as claimed in claim 2, wherein said brake band is made of synthetic resin.

4. A pressure fluid cylinder comprising a tubular casing, a piston with a connected piston rod reciprocable within said casing and defining two pressure chambers one on each side of the piston, brake means interposed between the outer wall of said piston and the inner wall of said casing, and means for operating said brake means mounted on said piston including pressure receiving means operable to engage the brake means against the casing when pressure in both of said pressure chambers is the same and to release the brake means when the pressure in one of said pressure chambers exceeds that in the other, said brake means comprising at least one annular brake band disposed within an annular groove formed in the outer wall of said piston, said annular brake band being resilient and having a radial self-returning force, said brake band having a cut-off portion, and said operating means including means engaging said cut-off portions for outwardly expanding said brake band to frictionally engage the inner wall of said cylinder casing.

5. A pressure fluid cylinder according to claim 4, wherein said operating means includes a movable plunger coupled to said pressure receiving means and having a neutral position in which said brake is expanded and engaged against said casing, resilient means for normally conditioning said plunger to its neutral position, movement of said plunger from its neutral position causing said operating means to release said brake band.

6. The pressure fluid cylinder as claimed in claim 5, wherein said means engaging said cut-off portion comprises a ball disposed in a radial bore provided within said piston, said ball being outwardly thrust into said cut-off portion to expand said brake band and being inwardly thrust out of said cut-off portion by the self-returning force of said brake band.

7. The pressure fluid cylinder as claimed in claim 5, wherein said operating means includes an elliptical cam disposed within the said cut-off portion, said cam being mounted on a rotor rotatable within a radial bore provided in said piston, a pinion gear on said rotor, and a rack on said plunger in mesh with said pinion gear, said cam being rotated to expand said brake band by movement of said plunger.

8. The pressure fluid cylinder according to claim 6, wherein said cut-off portions of the brake band are outwardly tapered toward one another.

9. The pressure fluid cylinder as claimed in claim 7, wherein said cut-off portion of the brake band has straight faces disposed approximately radially of the piston.

10. The pressure fluid cylinder as claimed in claim 8, wherein said plunger has a pair of annular grooves separated by a land, said plunger being axially reciprocable within said piston to thrust said ball outwardly into said cut-off portion by means of said land.

11. A pressure fluid cylinder as claimed in claim 10, wherein said resilient means for normally conditioning said plunger to its neutral position comprises a pair of coiled springs disposed at the ends of a second plunger reciprocable within said piston parallel to the axis of the piston, said first and second plungers being coupled by said pressure receiving means.

12. A pressure fluid cylinder comprising a tubular casing, a piston with a connected piston rod reciprocable within said casing and defining two pressure chambers one on each side of the piston, brake means interposed between the outer wall of said piston and the inner wall of said casing, and means for operating said brake means mounted on said piston including pressure receiving means operable to engage the brake means against the casing when pressure in both of said pressure chambers is the same and to release the brake means when the pressure in one of said pressure chambers exceeds that in the other, said brake means comprising a pair of annular brake bands disposed within an annular groove drilled along the outer wall of said piston means, each of said brake bands having a cut-off portion of which the cut-off faces are tapered outwardly toward one another, said cut-off portions being positioned on diametrically opposite sides of the outer wall of said piston, and said operating means being operable to expand and release both of said brake bands.

* * * * *